Dec. 2, 1969            G. J. SHELDON           3,481,660
FIBER OPTIC INSPECTION DEVICE
Filed March 26, 1968           2 Sheets-Sheet 1
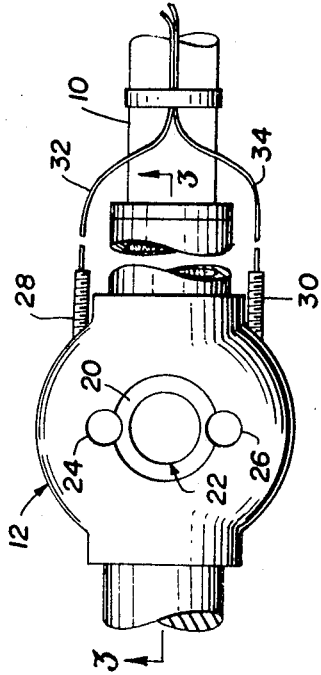
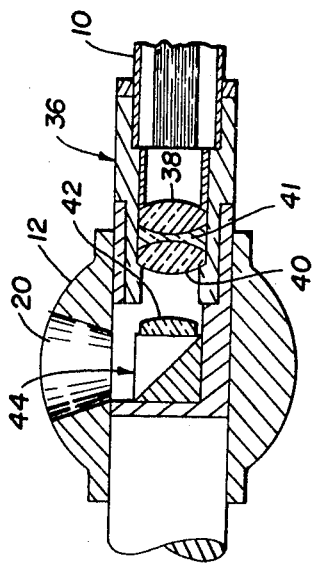
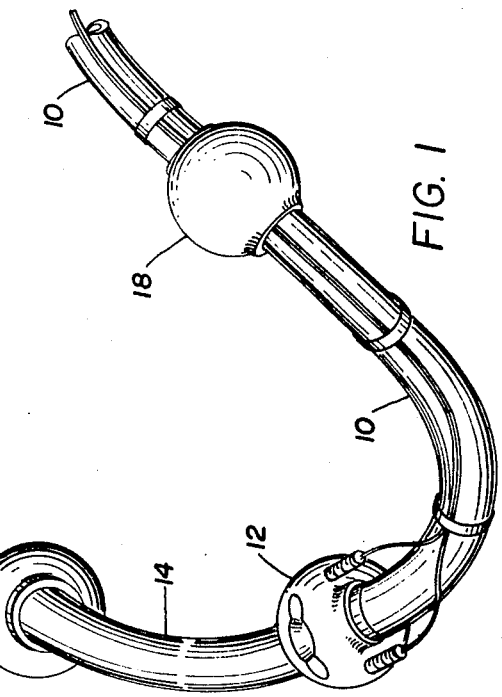
GILBERT J. SHELDON
INVENTOR.
BY Frank C. Parker
ATTORNEY Dec. 2, 1969   G. J. SHELDON   3,481,660
FIBER OPTIC INSPECTION DEVICE
Filed March 26, 1968   2 Sheets-Sheet 2

GILBERT J. SHELDON
INVENTOR.

BY *Frank C. Parker*

ATTORNEY

United States Patent Office 3,481,660
Patented Dec. 2, 1969

3,481,660
FIBER OPTIC INSPECTION DEVICE
Gilbert J. Sheldon, Irondequoit, N.Y., assignor to Bausch & Lomb Incorporated, Rochester, N.Y., a corporation of New York
Filed Mar. 26, 1968, Ser. No. 716,090
Int. Cl. G02b 5/14; G01n 21/32
U.S. Cl. 350—96                                    3 Claims

ABSTRACT OF THE DISCLOSURE

A fiber optical inspection device used for inspecting the inside surfaces of curved elongated tubular articles. The device is characterized by means for positioning the objective lens systems at a fixed distance from the surface of the inspection. The position is maintained as the inspection device is moved into and out of the article being inspected. The device is further characterized by means for preventing bending movement about the longitudinal axis of the fiber bundle during the inspection.

BACKGROUND OF THE INVENTION

This invention relates to an improved inspection device used to inspect the interior surfaces of hollow elongated articles and especially those articles having curves in the tubular portion.

Inspection devices of the type used for inspecting interior surfaces of articles such as tubes have been known for sometime. The well known devices are adequate for inspecting straight tubular articles on the interior surface thereof. However, the well known inspection device or borescopes, as they are commonly called, are less than desirable for inspecting curved tubing such as commonly found in condenser coils, heat exchangers or the like. The well known borescope, when used for inspecting curved tubes, must be flexible in order to see the interior walls of the tube in the curved portions. Furthermore, if the borescope is made flexible, by employing a light transmitting fiber optical bundle, when the device is moved around the curve in the tube it has a tendency to twist about the axis of the fiber bundle.

SUMMARY OF THE INVENTION

In order to overcome the above described problems, and to, in general, provide an improved inspection device, I provide means for mounting the optical lens system at a fixed distance from the surface to be inspected and also provide means for preventing bending of the inspection device as it moves around curves in the article under inspection.

Accordingly, it is the primary object of the present invention to provide a fiber optical inspection device for inspecting curved surfaces of hollow elongated articles.

It is a further object of the present invention to provide a fiber optical inspection device that will not bend about its axis as it is inserted into and moved along the interior surface of a tubular article.

It is still another object of the present invention to provide a fiber optical inspection device wherein the light source is carried with the optical lens system and focuses upon the area to be inspected.

BRIEF DESCRIPTION OF THE DRAWINGS

FIGURE 1 is a perspective view of the device of the present invention.

FIGURE 2 is a top view of the lens and lamp carrying portion of the inspection device.

FIGURE 3 is a section taken along lines 3—3 of FIGURE 2.

DESCRIPTION OF THE PREFERRED EMBODIMENT

Figure 4:
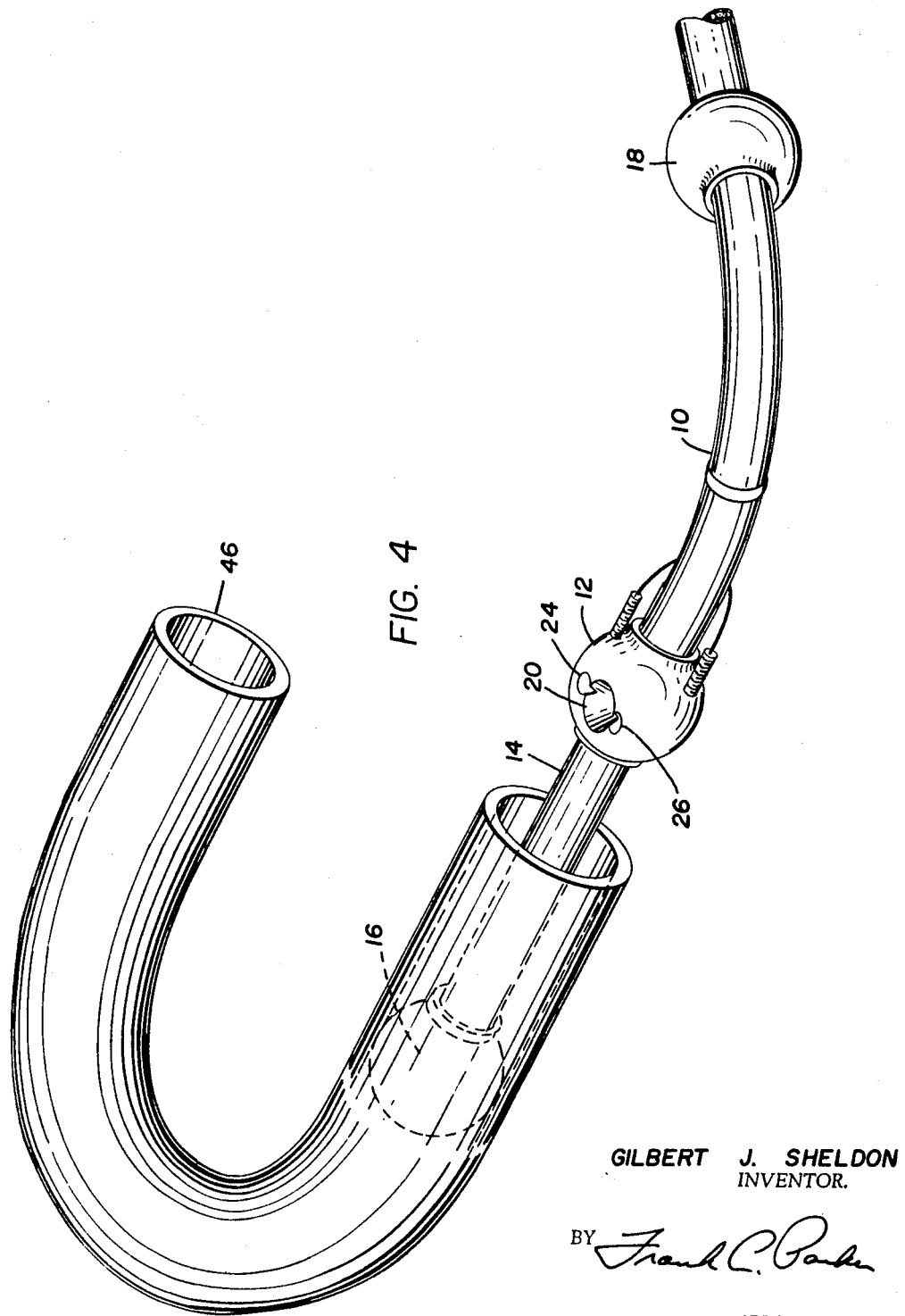
FIGURE 4 is a perspective view of the device of the present invention being inserted into a curved tube.

Referring to the drawing and in particular FIGURE 1, number 10 shows a fiber optical bundle as is well known in the art. At one end of the fiber bundle 10 there is a lens system mounting member 12 and at the other end there is an eyepiece (not shown) as is well known in the art. Attached to member 12 is a leader member 14, tubular in shape, flexible, and of approximately the same diameter as the fiber bundle 10. Attached to the end of leader member 14 is a spherical positioning member 16. Surrounding fiber bundle 10 and positioned behind objective lens mounting member 12 is a second positioning member 18.

The lens mounting member 12 and positioning members 16 and 18 are manufactured with a diameter slightly smaller than the inside diameter of the tube to be inspected. The diameter difference need be only small enough to permit easy insertion of the device into the tube and allow free movement of the device around the curved surface to be inspected. The diameter of the member 12, 16 and 18 will be selected according to the fixed optical system so that the wall of the tube of any given size is always in focus.

As shown in FIGURE 2 the lens system mounting member contains an aperture 20 communicating with the lens system shown generally as 22. Also shown in FIGURE 2 are two lamps 24 and 26, and corresponding electrical connectors 28 and 30 for energizing lamps 24 and 26. The electrical connectors 28 and 30 are connected by electrical conduits 32 and 34 to a suitable source of electricity (not shown).

FIGURE 3 shows the fiber bundle 10 attached to the lens system mounting member 12 by means of a receiving member designated generally as 36. The lens receiving member 36 contains a lens system comprised of lenses 38, 40, 41, 42 and prism mirror system 44. The optical system 38, 40, 41, 42, 44 is selected to provide a focused image at the eyepiece from the interior wall of the tube. The optical system depicted in the drawings is shown for illustration only as any system that adequately carries the image from the wall to the fiber bundle may be used.

The members 12, 16, and 18 can be made from a variety of materials such as wood, metal, plastics or other hard synthetic materials. I have found that with a device of this type polytetrafluorethylene is a very good material for manufacturing the positioning members.

The operation of the device can be seen in connection with FIGURE 4 wherein there is shown a tube of curved configuration to be inspected. The device according to the invention is inserted in the tube 46 by placing member 16 into the tube first with the member 12 positioned so that aperture 20 is in a preselected position for viewing a path along the interior surface of tube 46.

The entire device is then slowly inserted into the tube 46 and the operator or inspector looking into the eyepiece (not shown) can view the interior surface of the article. The positioning members 16, 14, 12 and 18 prevent bending of the lens mounting member 12 as the device is moved along the interior surface of the tube. The member 12 maintains the proper spacing between the tube wall and the lens system so that the interior surface of the tube is always in focus. This permits the operator to concentrate on viewing the tube surface without having to constantly focus the optical system.

Lamps 24 and 26 are mounted adjacent to the aperture 20 for the lens system and provide uniform illumination at the point of inspection because they travel in a fixed position with the lens system. Two lamps are shown in the preferred embodiment, however, it may be entirely desirable to use a single source of illumination, or a source of illumination that completely surrounds aperture 20.

I claim:
1. In combination with a flexible fiber optical borescope for inspecting elongated tubular objects, wherein there is provided a bundle of elongated optical fibers, an objective lens system, an angled reflector, an eyepiece and a source of illumination the improvement which comprises:
   a first generally spherical member surrounding the borescope at the location of the objective lens system and the angled reflector and having a transverse aperture aligned with the angled reflector for maintaining the objective lens system at a fixed distance from the interior wall of the object to be inspected;
   a flexible leader member in advance of said first generally spherical member and attached thereto, said leader member having a second generally spherical member at its forward end to maintain the objective lens in a fixed travel path; and
   a third generally spherical member surrounding the fiber bundle between the objective lens system and the eyepiece to prevent tilting of the objective lens system as it is advanced along the path of inspection, said first, second and third generally spherical members having the same diameter, greater than the diameter of the borescope and slightly smaller than the inside diameter of the tubular object to be inspected.

2. A device according to claim 1 wherein said first generally spherical member contains said source of illumination to project light in an area coincident with the area viewed by the objective lens system.

3. A device according to claim 1 wherein said first, second and third generally spherical members are manufactured from polytetrafluorethylene.

References Cited
UNITED STATES PATENTS

| | | |
|---|---|---|
| 2,899,856 | 8/1959 | Shull. |
| 3,057,345 | 10/1962 | Ferris et al. |
| 3,256,875 | 6/1966 | Tsepelev et al. |

DAVID H. RUBIN, Primary Examiner

U.S. Cl. X.R.
95—11; 128—4, 6; 356—241